(12) United States Patent
Magnant et al.

(10) Patent No.: US 11,262,444 B2
(45) Date of Patent: Mar. 1, 2022

(54) METHOD FOR TRACKING TARGETS, IN PARTICULAR MARITIME TARGETS, AND RADAR IMPLEMENTING SUCH A METHOD

(71) Applicant: THALES, Courbevoie (FR)

(72) Inventors: Clément Magnant, Talence (FR); Vincent Corretja, Pessac (FR); Julien Petitjean, Pessac (FR); Stéphane Kemkemian, Paris (FR)

(73) Assignee: THALES, Courbevoie (FR)

( * ) Notice: Subject to any disclaimer, the term of this patent is extended or adjusted under 35 U.S.C. 154(b) by 297 days.

(21) Appl. No.: 16/404,610

(22) Filed: May 6, 2019

(65) Prior Publication Data

US 2019/0346552 A1 Nov. 14, 2019

(30) Foreign Application Priority Data

May 9, 2018 (FR) ...................................... 1800437

(51) Int. Cl.
*G01S 13/72* (2006.01)

(52) U.S. Cl.
CPC ................................. *G01S 13/726* (2013.01)

(58) Field of Classification Search
CPC .... G01S 13/726; G01S 13/917; G01S 13/937; G01S 2201/08
See application file for complete search history.

(56) References Cited

U.S. PATENT DOCUMENTS

| 10,222,177 | B2* | 3/2019 | Miralles | G05D 1/12 |
| 2007/0023582 | A1* | 2/2007 | Steele | B64D 7/00 |
| | | | | 244/190 |
| 2010/0283669 | A1* | 11/2010 | Discamps | G01S 13/9054 |
| | | | | 342/25 F |
| 2011/0102247 | A1* | 5/2011 | Pauli | G01S 7/2927 |
| | | | | 342/159 |
| 2017/0307734 | A1* | 10/2017 | Corretja | G01S 7/414 |

FOREIGN PATENT DOCUMENTS

| EP | 3 236 281 A1 | 10/2017 |
| EP | 3 239 656 A1 | 11/2017 |
| EP | 3 246 726 A1 | 11/2017 |

OTHER PUBLICATIONS

Magnant, et al., "Joint tracking and classification for extended targets in maritime surveillance", 2018 IEEE Radar Conference (RadarConf18), pp. 1117-1122, Apr. 23, 2018.

* cited by examiner

*Primary Examiner* — Donald H B Braswell
(74) *Attorney, Agent, or Firm* — BakerHostetler

(57) ABSTRACT

A method includes at least a preliminary step of storing a set of tracking algorithms as a function of types of targets and of environments, each tracking algorithm being a function of a type of target in a given environment; a step of detecting signals backscattered by the targets resulting in primary detections being obtained; the detection step being followed, for each detected target: by a step: of characterizing the detected target into types of target on the basis of the primary detections; and of analysing the environment of the targets in order to determine in which given environment each detected target is located; a step of adapting the tracking to each detected target, the adapting being completed by selecting the tracking algorithm as a function of the type of target to which the target belongs and of the given environment in which it is located.

7 Claims, 5 Drawing Sheets

METHOD FOR TRACKING TARGETS, IN PARTICULAR MARITIME TARGETS, AND RADAR IMPLEMENTING SUCH A METHOD

CROSS-REFERENCE TO RELATED APPLICATIONS

This application claims priority to foreign French patent application No. FR 1800437, filed on May 9, 2018, the disclosure of which is incorporated by reference in its entirety.

FIELD OF THE INVENTION

The present invention relates to a method for tracking targets, in particular maritime targets. The invention also relates to a radar implementing such a method.

The field of application of the invention is that of airborne radar for maritime surveillance.

BACKGROUND

Within the context of maritime surveillance, the mission of an airborne radar is to detect and track the marine targets that are present. In order to complete this mission, the radar picks up the signal backscattered by the targets. This signal is subsequently analysed in order to extract radar measurements characterizing the potential positions of objects of interest to which tracking is generally applied.

Currently, in maritime surveillance radar, the tracking processing functions are not optimized according to the environmental data measured by or accessible to the radar. Thus, all the targets detected in a given surveillance area are tracked in the same way.

A major disadvantage of this solution is that the overall performance of the tracking is not the maximum performance that can be achieved. Furthermore, in the event that the tracking processing functions can be manually adapted by an operator, the disadvantages are particularly as follows:
  a required time spent by the operator that is too long to identify tracking areas specific to the adjustment of the on-board algorithm;
  the operator must, in order to make a correct selection, have been trained, on the one hand, and must have significant experience, on the other hand.

SUMMARY OF THE INVENTION

An aim of the invention is to particularly overcome the aforementioned disadvantages. To this end, the aim of the invention is a method for tracking targets using an airborne radar, comprising at least:
  a preliminary step of storing a set of tracking algorithms as a function of types of targets and of environments, each tracking algorithm being a function of a type of target in a given environment;
  a step of detecting signals backscattered by said targets resulting in primary detections being obtained;
said detection step being followed, for each detected target:
  by a step:
    of characterizing said detected target into types of target on the basis of said primary detections; and
    of analysing the environment of said targets in order to determine in which given environment each detected target is located;
  a step of adapting the tracking to each detected target, said adapting being completed by selecting the tracking algorithm as a function of the type of target to which said target belongs and of the given environment in which it is located.

Said targets are maritime targets, for example.

A tracking algorithm comprises at least one stage of filtering primary detections and a set of tracking parameters as a function of the type of target and of the environment.

Each tracking algorithm comprises, for example, processing for the short-term tracking operations and processing for the long-term tracking operations.

Said set of tracking algorithms can change during the same surveillance mission of said airborne radar.

Each given environment integrates, for example, one or more of the following environment element(s):
  the sea clutter;
  the sea state;
  the direction and the force of the wind;
  the topography;
  the geographical location;
  the estimation of the signal-to-noise ratio.

Each type of target is, for example, characterized by one or more of the following parameter(s):
  the radar cross section (RCS);
  the distance spread;
  the relative radial speed.

A further aim of the invention is a radar implementing such a method.

BRIEF DESCRIPTION OF THE DRAWINGS

Further features and advantages of the invention will become apparent from the following description, which is provided with reference to the accompanying drawings, in which.

DETAILED DESCRIPTION

Figure 1A:
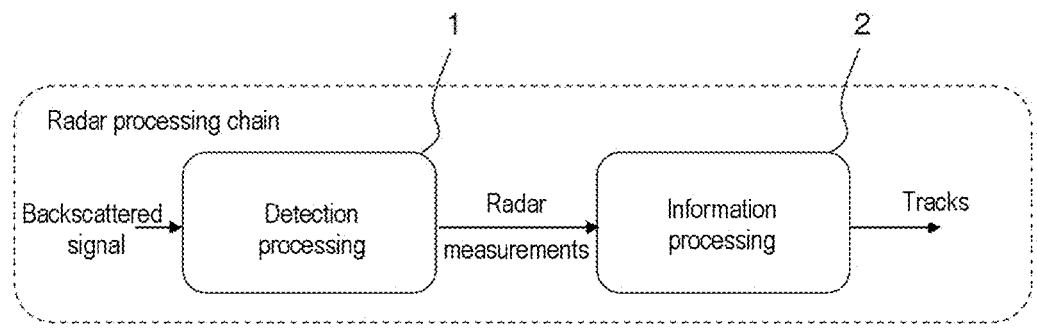
FIGS. 1a and 1b show an illustration of a tracking processing function according to the prior art.
Figure 1B:
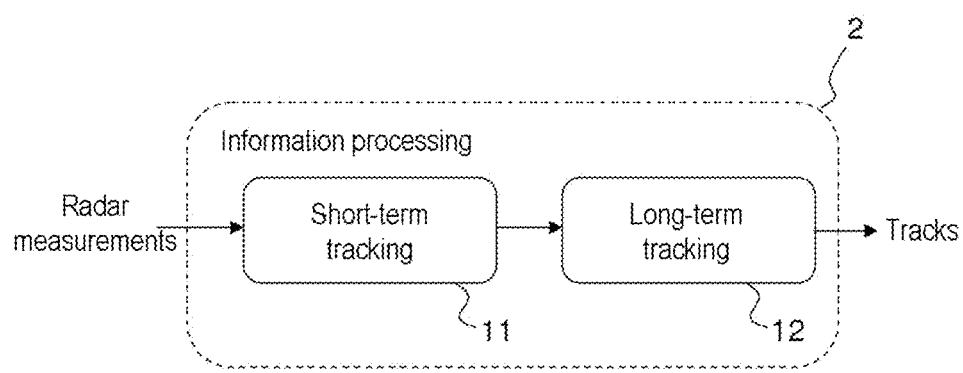

FIGS. 1a and 1b show the conventional tracking processing function particularly applied to a maritime surveillance radar, with FIG. 1a more specifically showing a processing chain according to the prior art.

In the field of radar, the detection and the tracking of a target are carried out on the basis of two distinct processing blocks 1, 2. The purpose of the first block 1 is to extract primary detections or radar measurements, on the basis of a received signal backscattered by a target. These measurements are subsequently used by the second block 2 for processing information, the purpose of which is to complete the tracking of the targets in an area of interest on the basis of the measurements supplied by the first block up to the current instant.

Within the context of the present invention, the block 2 for processing information shown in FIG. 1b is more specifically described. Numerous known processing functions for tracking targets allow the same architecture, irrespective of the type of targets tracked in an area of interest.

In the most comprehensive case, this block for processing information comprises a short-term tracking processing function 11 and a long-term tracking processing function 12: The "short-term" tracking operation is optional. This short-term tracking operation particularly allows the sensitivity of the radar to be enhanced by lowering the detection threshold for an a priori fixed (target) probability of false alarms. Without this processing, high numbers of false alarms would be transmitted to the "long-term tracking" block and would be manifested by a large number of false detections and of false tracks, which would be operationally unacceptable. A known solution then involves using the probable kinematics of the targets in order to differentiate them from the false alarms. This method, called short-term tracking, is, depending on its implementation, better known as "Track-Before-Detect" (TBD), or even as "Turn-by-Turn Integration" (TTI). The principle is as follows: if a succession of detections obtained on a plurality of illumination cycles corresponds to a succession of positions that sufficiently correlates with a kinematic model, it is considered to be a target, or otherwise a false alarm.

The "long-term" tracking function corresponds to the conventional tracking function of a radar (estimation of the trajectory of the tracked targets).

In this breakdown, which is provided by way of an example, the two "short-term" and "long-term" term tracking functions are separated. Nevertheless, the two functions (elimination of false alarms of unlikely kinematics and estimation of long-term trajectory) can be completed in the same structure.

The TBD and TTI techniques involve performing kinematic filtering of various measurements that correlate on a turn-by-turn basis (i.e. which potentially represent the same target over time). This filtering is based on various motion models of targets, such as uniform straight motion, evenly accelerated motion, the Singer model, etc. These models enable prediction of the evolution of the positions, speeds and accelerations of the targets. The principle of TBD is based on the hypothesis that the real targets have coherent kinematics over time, whereas most of the false alarms originating from thermal noise and from interference (ground, sea and atmosphere) spatially appear in a random manner and over a short time period.

Finally, in order to reduce the probability of false alarms, processing of the TBD or TTI type is often considered at the input of the tracking processing block. These approaches are based on a detection criterion of the k/N type that influences the speed of appearance of the targets. Thus, in order to determine whether or not a series of detections corresponds to a target, it involves assessing, over a rolling horizon of N illuminations, if at least k primary detections correlate, i.e. are coherent with the considered kinematic model.

If this is the case, these detections are transmitted to the tracking called long-term tracking.

Throughout the following description of the invention, reference is made to the two-step solution of FIG. 1b, even though the invention is equally applicable to the case whereby a single filtering stage is responsible for both types of tracking.

In a conventional processing chain, as shown in FIG. 1a, the selection of the processing (type of filter and associated parameters in particular) is unique and predefined, irrespective of the targets and their environment.

The method according to the invention advantageously adapts the tracking processing functions in real time, not only on the basis of the intrinsic features of the targets, but also on the basis of the study of the environment of the radar over its entire field of detection.

Figure 2:
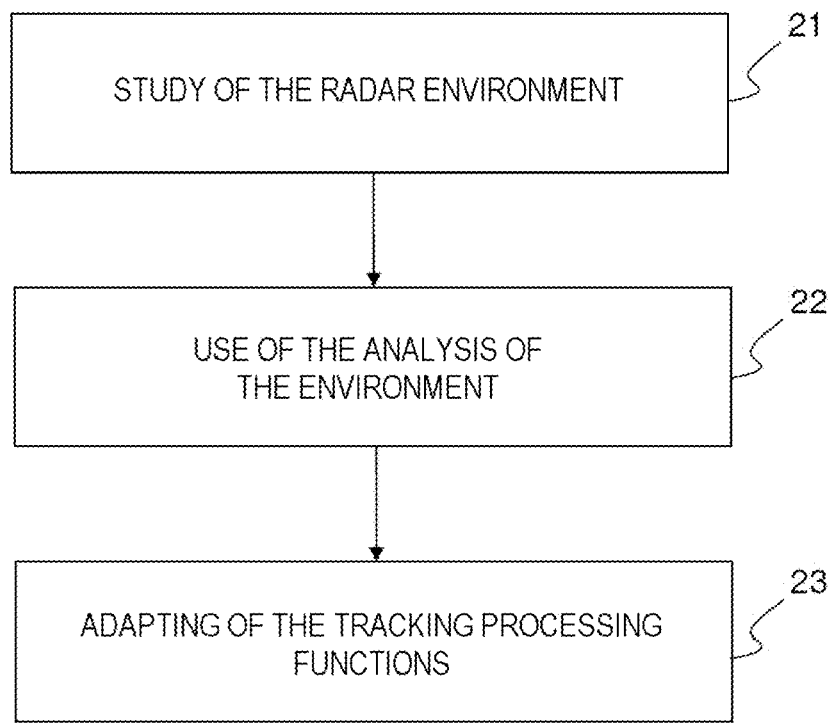
FIG. 2 shows a presentation of possible steps implementing the method according to the invention.

FIG. 2 shows three steps of the method according to the invention, these three steps are:
- a step 21 of studying the environment of the radar implementing the method;
- a step 22 of using the analysis of the environment;
- a step 23 of adapting tracking processing functions.

As will be shown in the remainder of the description, in this third step the method according to the invention benefits, in real time, from the analysis of the environment of the radar over its entire field of detection in order to automatically and adaptively define the tracking processing according to the detected targets and their respective environments.

In the first step 21, the study of the environment of the radar is completed on the basis of the radar processing functions and of sources outside the radar. The sources outside the radar are, for example, DTM (Digital Terrain Model) files or even collections of meteorological information.

In the second step 22, the aim of the use of the analysis of the environment is to benefit from this analysis in order to adapt the tracking processing in the third step.

Non-exhaustive examples of the use of the analysis of the environment are described hereafter.

Use of the clutter analysis:

Given the position of the carrier platform of the radar, said radar picks up the signal backscattered by the surface of the sea as a function of the emitted waveform. The properties of this signal, also called sea clutter, depend on known parameters, such as the distance resolution, the altitude of the platform and the area of the resolution cell and other parameters that can be deduced from the sea clutter models of the prior art, such as the direction of the wind and the swell.

A target located in an area of high-intensity clutter (endo-clutter area) will have a lower probability of moving at a significant speed and of maneuvering than an exo-clutter target (environment only formed by thermal noise) on a calm sea. It is thus possible to adapt the motion models and their parameters.

Use of the sea state:

As the rate of false alarms is generally greater in the endo-clutter areas than in the exo-clutter areas, the criteria for creating or deleting tracks can be adapted to each of the situations.

Use of the wind direction and force:

The probability of detection and the rate of false alarms can be correlated with the areas called downwind, upwind, crosswind and thus can be adapted accordingly in the tracking functions.

Use of the DTM files (topography):

Due to the increasing improvement in the detection performance of surveillance radar, it is possible to detect more and more targets while managing the rate of false alarms. More specifically, it is known that numerous detections are present in a coastal environment. These are not false alarms but correspond to detections of low radar cross-sections (RCS), such as small fishing boats, buoys, oyster farms, etc. This sensitivity of the radar, in particular in the vicinity of coastal areas, which is new compared to existing radar, has the effect of providing a tactical situation that can be difficult to process. Thus, the digital terrain models (DMTs) can be used not only in order to distinguish the terrestrial areas from the maritime areas, but also in order to identify the coastal areas on the terrestrial globe. The tracking processing functions for open sea targets and for targets close to coasts then can be differentiated.

Use of road/air/maritime maps (geographical location of the targets):
The behaviour of the targets is sometimes easier to predict as they move on restricted surfaces/routes. With respect to maritime transport, some boats follow predefined routes. It is then possible to integrate this information a priori in the models of the movement of the targets.

Use of the estimation of the Signal-to-Noise ratio:
The probability of detecting a target can be easily correlated with the signal-to-noise ratio (SNR) or even with the clutter-to-noise ratio (CNR). Likewise, the probability, a priori, that a detection corresponds to a target or to a false alarm can be correlated with the SNR/CNR. Thus, it is possible to adapt the modelling of these probabilities in the tracking functions.

The intrinsic features of targets also can be used to adapt the detection criteria, in order to particularly improve the ability to detect more quickly. In particular, the following uses can be considered:

Use of the RCS measurement:
The RCS of a target can be considered to be a maneuverability indicator of the target. Indeed, it can be assumed that the lower the RCS of a target, the greater its maneuvering capabilities. It is thus possible to adapt the motion models and their parameters.

Use of the distance spread of the target:
The size of a target can be considered to be a maneuverability indicator of the target. Indeed, it can be assumed that the smaller a target, the greater its maneuvering capabilities. It is thus possible to adapt the motion models and their parameters.

Use of the relative radial speed:
The speed of a target and its rate of variation can provide an indication of the maneuvering capability of a target, but also of the maximum refreshment time to avoid losing the track. It is thus possible to adapt the motion models and their parameters, as well as the illumination period of the target (in particular with electronic scanning radar).

In the third step 23, the adaptability of the tracking processing functions is performed, for example, on the following different levels:
   modelling of the rate of false alarms and of the probability of detection;
   selection of the short-term tracking algorithm (TBD, TTI, or other) and of the associated parameters;
   selection of the long-term tracking algorithm and of the associated parameters;
   selection of the one or more dynamic model(s) characterizing the movement of the targets (uniform straight motion, Singer motion, evenly accelerated motion, for example);
   selection of the parameters associated with these models (variance on the model and measurement noises, size of the minimum and maximum correlation windows, for example);
   modelling of the statistics of the model and measurement noise.

As will be shown in the remainder of the description, in order to implement this step 23, various tracking processing chains (or tracking algorithms) are completed in a preliminary step, in which each chain is adapted to a type of target and to an environment. In this third step 23, the selection of the tracking algorithm depends on the types of targets and on the environments that have been characterized in the preceding steps.

Figure 3:
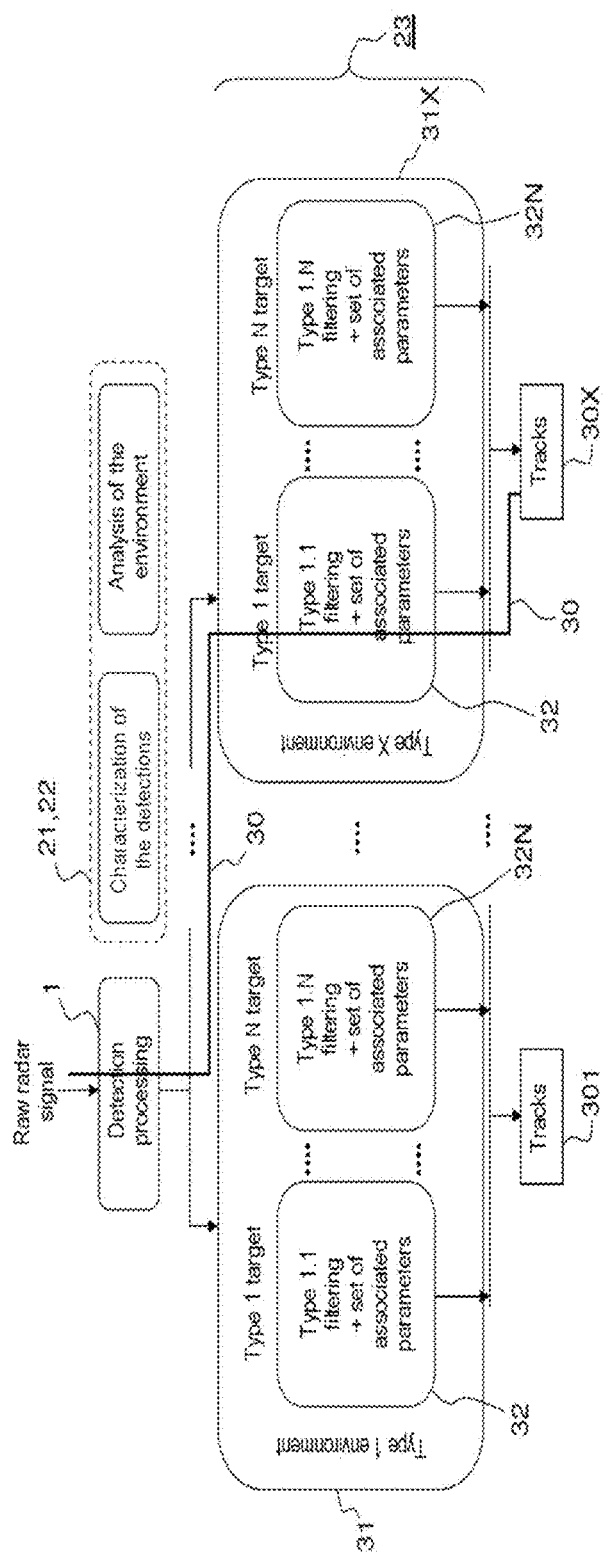
FIG. 3 shows a generic illustration of the method according to the invention.

FIG. 3 specifies the structure of the steps of the method according to the invention as previously described.

With reference to FIG. 1a, the tracking method according to the invention still comprises the step 1 of processing detection, having as input the raw radar signal backscattered by a target.

The steps 21, 22 of studying the environment and of using the analysis of the environment as previously described allow selection, in the next step 23, of the tracking processing function adapted to each target.

In the analysis of the environment 22, the radar completes a characterization of the targets, on the basis of the detected signals 1, more specifically on the basis of the primary detections obtained in the step 1 of processing detections.

This characterization is particularly defined by the RCS, the length (spread) and the speed of the targets. The other environment parameters are also analysed, as has been described for examples of parameters in steps 21, 22 above. All these analyses are performed by the processing means of the radar.

In a preliminary step, as a function of the surveillance mission, X types of possible environments 31, 31X are retained, in accordance with the previously described types of environment that are used. Similarly, N types of targets are defined for all the environments. Thus, N types of targets are obtained per environment, where each type of target has an associated tracking processing function 32, 32N. Each tracking processing function is characterized by a filtering operation and a set of associated tracking parameters. For each type of target, the filtering processing function is adapted to the environment. Thus, the 1.1 type filtering of the tracking processing function of the type 1 target in the type 1 environment can differ from the X.1 type filtering for this same type 1 target in the X type environment. Similarly, the 1.N type filtering of the N type target in the type 1 environment can differ from the X.N type filtering in the X type environment.

For each type of environment that is retained, all the types of targets are thus retained that are analysed with their associated tracking processing functions. For each type of target, a path is provided as a function of the environment. By way of an example, FIG. 3 shows a processing chain 30 for a type 1 target in the X type environment, resulting in tracks 30X being obtained.

The radar processing means therefore comprise, in a memory, a set of tracking algorithms consolidated according to the types of targets and the types of environment. The algorithmic structure of the tracking processing function according to the invention therefore allows automatic selection of a specific tracking function adapted to each situation (type of target in a type of environment). For each detected target, the selection of the tracking algorithm is a function of the type of target to which said target belongs and of the environment in which it is located. The selection is automatically made by the processing means, without any intervention from an external operator. Auto-adaptive processing is thus obtained.

The types of targets and the types of environment that are retained can change over time, particularly with respect to the numbers thereof. In other words, the stored or preselected tracking algorithms can vary over time. For example, they can vary as a function of the evolution of the mission of the surveillance radar.

Figure 4:
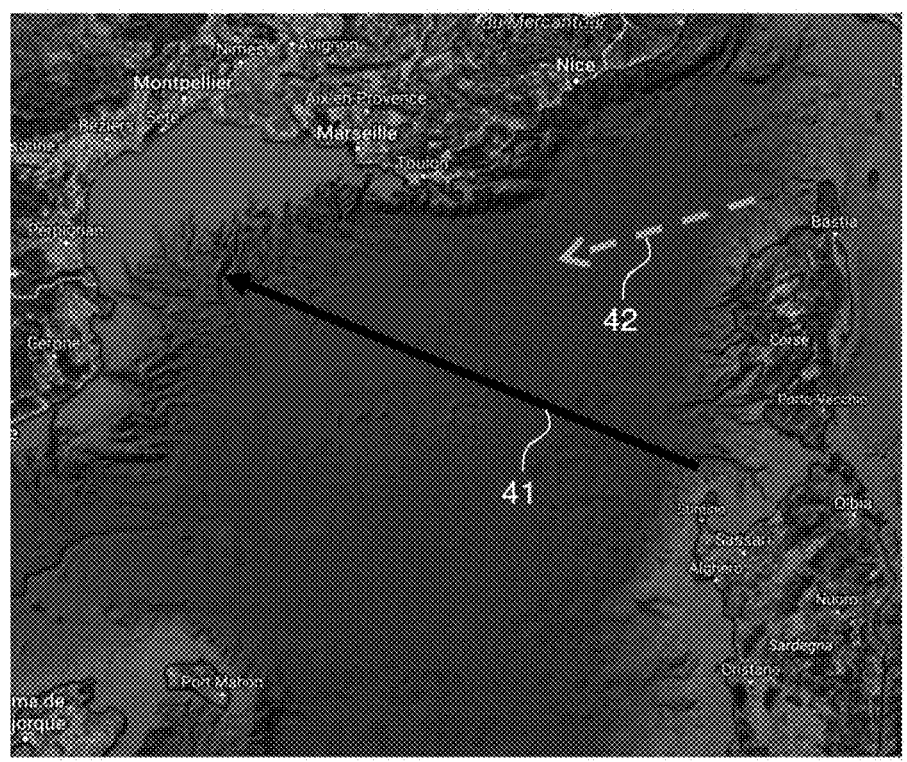
FIG. 4 shows an example of the application of the tracking method according to the invention.
Figure 5:
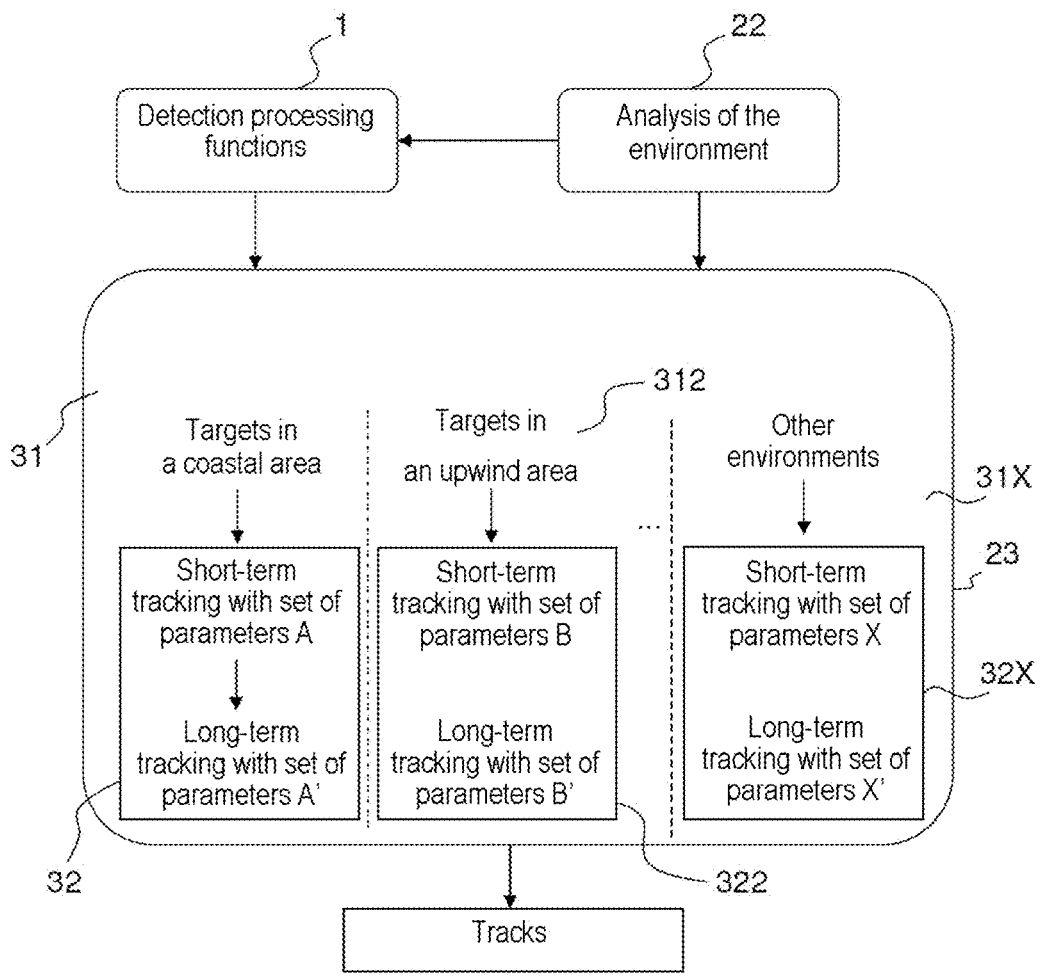
FIG. 5 shows an illustration of the method according to the invention adapted, for example, to the case of FIG. 4.

FIG. 4 shows an example of the application of the invention. FIG. 5, which will be described hereafter, shows an embodiment of the method according to the invention adapted to the application case of FIG. 4.

In FIG. 4, the radar carrier flies above the Mediterranean sea along a trajectory 41, with the wind direction 42 intersecting this trajectory. In this example, the analysis of the environment allows the following information to be extracted:
  sea state: force 3;
  wind direction: 250°,
  detection and identification of the coastal areas.

The tracking processing functions are adapted from the analysis of the environment, as shown in FIG. 5 and the following tables. With respect to the tracking processing functions, a distinction is made between short-term type tracking functions and long-term type tracking functions.

The structure of the tracking algorithm shown in FIG. 5 is a particular case of the general structure shown in FIG. 3, more specifically with respect to the step 23 of adapting tracking functions.

A first type of environment 31 describes the targets in a coastal area. A second type of environment 312 describes the upwind targets. Other environments 31X are considered, for example, the sea state.

In the example of FIG. 5, there is a single type of filtering stage per environment, a filtering stage for the short-term tracking function and a filtering stage for the long-term tracking function. The sets of parameters associated with the filtering stages are described, by way of an example, in tables 1 and 2 below.

Table 1 describes the short-term tracking parameters. The parameters used are the detection criterion k/N, the motion model of the target, the standard deviation on the acceleration of the target and the standard deviation on the measurement noise.

Table 2 describes the long-term tracking parameters. The parameters used are the motion model, the standard deviation on the acceleration and the standard deviation on the measurement noise.

Each line indicates the type of filtering stage and the values of the parameters associated with an environment. With reference to FIG. 5, the sets of parameters A, A', of parameters B, B' and X, X' respectively correspond to the targets in a coastal area, to the targets in an "upwind" area, and to the other environments. The second column of the tables indicates the type of filtering stage used in association with these parameters. Thus, in a coastal area, for the short-term tracking function, a Kalman filter is used while considering a uniform straight motion, a standard deviation of 0.02 g on the acceleration and a standard deviation of $\sigma_d$=10 m and $\sigma_{az}$=5 mrad (1$^{st}$ line of table 1, set of parameters A) on the measurement noise. In the other environments, for a long-term tracking function, a Kalman filter is used, while considering a Singer model, a standard deviation of 0.2 g on the acceleration and a standard deviation of $\sigma_d$=15 m and $\sigma_{az}$=7 mrad on the measurement noise (3$^{rd}$ line of table 2, sets of parameters X').

TABLE 1

| Sets of parameters | k/N | Type of filtering stage | Motion model | Standard deviation on the acceleration | Standard deviation on the measurement noise |
|---|---|---|---|---|---|
| A | 4/7 | Kalman | Even Straight | 0.02 g | $\sigma_d$ = 10 m; $\sigma_{az}$ = 5 mrad |
| B | 4/6 | Kalman | Even Straight | 0.01 g | $\sigma_d$ = 15 m; $\sigma_{az}$ = 7 mrad |
| X | 3/6 | Kalman | Even Straight | 0.1 g | $\sigma_d$ = 15 m; $\sigma_{az}$ = 7 mrad |

TABLE 2

| Sets of parameters | Type of filtering stage | Motion model | Standard deviation on the acceleration | Standard deviation on the measurement noise |
|---|---|---|---|---|
| A' | CMKF | Even Straight | 0.05 g | $\sigma_d$ = 10 m; $\sigma_{az}$ = 5 mrad |
| B' | Particle filter | Even Straight | 0.02 g | $\sigma_d$ = 15 m; $\sigma_{az}$ = 7 mrad |
| X' | Kalman | Singer Model | 0.2 g | $\sigma_d$ = 15 m; $\sigma_{az}$ = 7 mrad |

Within the scope of the maritime surveillance shown in FIG. 4, and as is the case for any maritime surveillance, the mission of the airborne radar is to detect and track the marine targets that are present. In order to complete this mission, the radar picks up the signals backscattered by the targets, these signals are subsequently analysed in order to extract radar measurements characterizing the potential positions of objects of interest to which the tracking method according to the invention is applied.

The signal picked up by the radar is also made up of an interference signal backscattered by the sea (sea "clutter"). The position and the intensity of the area of clutter are particularly variable according to the sea state and the presentation in relation to the wind. Advantageously, the invention allows the tracking to be differentiated according to the environmental characteristics of the detections associated with a target (target in a downwind sector VS target in an upwind sector, presence of significant clutter or only of thermal noise in the environment of the target, proximity to coastal areas, etc.). The various processing chains of the method shown in FIG. 5 allow the tracking to be adapted to the application case of FIG. 4.

Advantageously, the invention provides the radar with a capability to automatically self-optimise the tracking processing functions by virtue of the knowledge of its environment and as a function of the operational requirement.

The study of the environment can originate from a plurality of sources, in particular:
  from sources outside the radar: for example, the use of digital terrain files, the collection of weather information, etc.;
  from the radar by virtue of a suitable analysis of the received radar signals. This analysis of the environment also aims to deduce information similar to that of the preceding point, but provides a more detailed analysis, particularly with respect to the characterization of the encountered clutter.

This study of the environment provides, for example, information relating to:
  the characteristics of the sea clutter by an algorithmic analysis of the power of the backscattered signal or by the reception of weather data;
  the direction 42 of the wind, which can be determined either by acquiring information originating from outside or automatically during the analysis of the environment by estimating the direction where the power of the signal backscattered by the sea is the highest;
  the proximity or non-proximity of the coastal area.

Based on this analysis, the radar tracks each detected target by using a tracking algorithm (processing chain 30) adapted to the relevant environment. The adaptation of the algorithmic solution retained to perform the tracking function is located, on the one hand, in the algorithm itself (TTI, TBD, Kalman filtering, particle filtering, mono-target or multi-target filtering, etc.) and, on the other hand, in the adjustment of the parameters of the retained algorithm.

The advantages of the invention are particularly as follows:
- optimization of the capabilities of the radar;
- optimization of the performance of the tracking by adapting it to each target;
- reduction of the workload of the operator;
- reduction of the training time for operatives.

More generally, the invention advantageously allows:
- improvement of the tracking performance by selecting the tracking algorithm that is most suitable for each of the tracked targets;
- reduction of the workload of the radar operators by automating all the processing functions and adapting them in an optimal manner, in practice a maritime surveillance operator is no longer required to a priori select surveillance areas adapted to only some types of targets.

The invention claimed is:

1. A method for tracking targets using an airborne radar, wherein it comprises at least:
   a preliminary step of storing a set of tracking algorithms as a function of types of targets and of environments, each tracking algorithm being a function of a type of target in a given environment;
   a step of detecting signals backscattered by said targets resulting in primary detections being obtained, said tracking algorithms comprise at least one stage of filtering said primary detections and a set of associated tracking parameters, the at least one stage of filtering being, for each type of target, adapted to the environment;
said detection step being followed, for each detected target:
   by a step:
      of characterizing said detected target into types of target on the basis of said primary detections; and
      of analysing the environment of said targets in order to determine in which given environment each detected target is located;
   a step of adapting the tracking to each detected target, said adapting being completed by selecting the tracking algorithm as a function of the type of target to which said target belongs and of the given environment in which it is located.

2. The method according to claim 1, wherein said targets are maritime targets.

3. The method according to claim 1, wherein each tracking algorithm comprises processing for the short-term tracking functions, called "Track Before Detect", and processing for the long-term tracking functions.

4. The method according to claim 1, wherein said set of tracking algorithms changes during the same surveillance mission of said airborne radar.

5. The method according to claim 1, wherein each given environment integrates one or more of the following environment element(s):
   the sea clutter;
   the sea state;
   the direction and the force of the wind;
   the topography;
   the geographical location;
   the estimation of the signal-to-noise ratio.

6. The method according to claim 1, wherein each type of target is characterized by one or more of the following parameter(s):
   the radar cross section;
   the distance spread;
   the relative radial speed.

7. A radar, wherein it is able to implement the method according to claim 1.

* * * * *